(12) United States Patent
Gino et al.

(10) Patent No.: US 9,768,977 B2
(45) Date of Patent: Sep. 19, 2017

(54) LOW-POWER CAN MANAGEMENT (71) Applicant: QUALCOMM Technologies International, Ltd., Cambridge (GB)

(72) Inventors: Shahar Gino, Haifa (IL); Eran Scharam, Haifa (IL); David Barr, Karmiel (IL)

(73) Assignee: QUALCOMM TECHNOLOGIES INTERNATIONAL, LTD, San Diego, CA (US)

( * ) Notice: Subject to any disclaimer, the term of this patent is extended or adjusted under 35 U.S.C. 154(b) by 203 days.

(21) Appl. No.: 14/789,754

(22) Filed: Jul. 1, 2015

(65) Prior Publication Data
US 2017/0005828 A1 Jan. 5, 2017

(51) Int. Cl.
*H04L 12/40* (2006.01)
*H04L 12/66* (2006.01)
*H04L 12/12* (2006.01)

(52) U.S. Cl.
CPC ........ *H04L 12/40039* (2013.01); *H04L 12/12* (2013.01); *H04L 12/40032* (2013.01); *H04L 12/40182* (2013.01); *H04L 12/40189* (2013.01); *H04L 12/66* (2013.01); *H04L 2012/40215* (2013.01); *H04L 2012/40273* (2013.01); *Y02B 60/34* (2013.01)

(58) Field of Classification Search
CPC ................................................. H04L 12/40039
See application file for complete search history.

(56) References Cited

U.S. PATENT DOCUMENTS

| 5,892,893 | A  | * | 4/1999  | Hanf    | G06F 1/3209   |
|           |    |   |         |         | 714/14        |
| 7,610,330 | B1 | * | 10/2009 | Quinn   | H04L 45/02    |
|           |    |   |         |         | 709/201       |
| 9,398,043 | B1 | * | 7/2016  | Yang    | H04L 63/1441  |
| 2007/0230484 | A1 | * | 10/2007 | Hu    | H04L 12/40039 |
|           |    |   |         |         | 370/401       |
| 2008/0306663 | A1 | * | 12/2008 | Warner | B60W 50/04   |
|           |    |   |         |         | 701/50        |
| 2009/0138628 | A1 | * | 5/2009  | Kanade | G06F 13/387  |
|           |    |   |         |         | 710/27        |

(Continued)

FOREIGN PATENT DOCUMENTS

EP 1858206 A1 11/2007
EP 2408141 A1 1/2012

OTHER PUBLICATIONS

International Search Report and Written Opinion—PCT/EP2016/064325—ISA/EPO—dated Sep. 27, 2016.

*Primary Examiner* — Parth Patel
(74) *Attorney, Agent, or Firm* — Procopio, Cory, Hargreaves & Savitch LLP/Qualcomm (57) ABSTRACT

The invention relates to a system and a corresponding method for communicating over N CAN buses comprising comprising N CAN listeners, wherein each of the CAN listeners is configured to be coupled to a respective CAN bus and to detect CAN activity on the CAN bus to which it is coupled; M CAN controllers, wherein $1 \leq M < N$; and a power controller, wherein each CAN listener is configured to generate a control signal in response to detecting CAN activity on the CAN bus to which it is coupled and send the control signal to the power controller which controls the activity state of at least one of the CAN controllers.

12 Claims, 4 Drawing Sheets

(56) References Cited

U.S. PATENT DOCUMENTS

| | | | | |
|---|---|---|---|---|
| 2010/0299466 A1* | 11/2010 | Asano | H04L 12/40013 | 710/105 |
| 2012/0210154 A1* | 8/2012 | Hartwich | H04L 12/40039 | 713/323 |
| 2013/0082531 A1* | 4/2013 | Quan | H02M 3/155 | 307/66 |
| 2013/0103959 A1* | 4/2013 | Hatta | H04L 12/12 | 713/310 |
| 2013/0139018 A1* | 5/2013 | Takada | H04L 12/407 | 714/748 |
| 2013/0318380 A1* | 11/2013 | Behrens | H04L 12/12 | 713/323 |
| 2014/0156893 A1* | 6/2014 | Monroe | G06F 13/372 | 710/117 |
| 2014/0247831 A1* | 9/2014 | Messner | H04L 12/12 | 370/400 |
| 2014/0310542 A1* | 10/2014 | Lejeune | G06F 1/3234 | 713/320 |
| 2015/0019897 A1* | 1/2015 | Horihata | H04L 12/40039 | 713/324 |
| 2015/0108992 A1* | 4/2015 | Kouda | G01R 31/3624 | 324/434 |
| 2015/0153754 A1* | 6/2015 | Klosters | G06F 1/3209 | 327/143 |
| 2015/0192983 A1* | 7/2015 | Rennig | G06F 1/3209 | 713/323 |
| 2015/0254206 A1* | 9/2015 | Biskup | G06F 13/4068 | 710/110 |
| 2016/0156717 A1* | 6/2016 | Matsumoto | H04L 67/14 | 709/226 |
| 2016/0288744 A1* | 10/2016 | Rutherford | B60L 1/00 | |

* cited by examiner

LOW-POWER CAN MANAGEMENT

TECHNICAL FIELD

Embodiments of the invention described herein relate to power management of a controller area network (CAN) system.

BACKGROUND

The controller area network (CAN) is a standard for message-based, distributed communications in industrial, automotive and instrumentation applications. The International Organization for Standardization released the original CAN standard in 1993 (ISO 11898) which has been further developed and refined since then. Some of the CAN features include multiple masters on a bus, inherent priority levels for messages, bus arbitration by message priority, error detection and recovery at different levels as well as synchronization of timing across nodes in spite of separate clock sources. The CAN protocol supports differential data transmission and thus bidirectional communications across a twisted pair cable as well as an increased immunity to noise.

Implementations of controller area networks are typically based on three components: transceivers, controllers and microcontrollers. Physical layer transceivers are required to 'translate' the CAN messages to/from differential signals exchanged across a physical medium such as a twisted pair cable. CAN controllers are required to implement the data link layer as defined by the ISO/OSI model. Finally, microcontroller units (MCUs) handle CAN messages at the higher levels of the ISO/OSI model. In its simplest form, the data path thus comprises an MCU coupled to a CAN controller which, in turn, is coupled to a CAN transceiver wherein the CAN transceiver is connected to a CAN bus. Taken together, the MCU, CAN controller and CAN transceiver define a CAN node.

CAN systems frequently have to communicate over multiple CAN networks/buses. A straightforward solution would be to use N data paths in case the system has to communicate over N CAN buses. However, even if a single MCU was used to serve the N CAN transceivers and N CAN controllers, this approach would increase power-consumption to such an extent that it may be unacceptable in many applications, especially automotive applications where low-power consumption is of fundamental importance. Despite these strict low-power requirements, however, such in-car systems must be able to filter incoming messages with respect to their relevance and quickly react to relevant messages (typically within 25 ms). An example for such a message is an "Emergency Audio" request which requires immediate playback of a pre-defined audio signal, e.g., emergency alert, unbuckled seat belt and the like.

SUMMARY OF EMBODIMENTS OF THE INVENTION

According to a first aspect of embodiments of the present invention, there is provided a system for communicating over N CAN buses comprising N CAN listeners, wherein each of the CAN listeners is configured to be coupled to a respective CAN bus and to detect CAN activity on the CAN bus to which it is coupled; M CAN controllers, wherein $1 \leq M < N$; and a power controller, wherein each CAN listener is configured to generate a control signal in response to detecting CAN activity on the CAN bus to which it is coupled and send the control signal to the power controller which is configured to control the activity state of at least one of the CAN controllers. The power controller may of course be configured to control the activity state of all of the CAN controllers. Controlling the activity state may comprise reset deassertion and clock enabling.

At least two of the CAN listeners as well as the power controller may be located in a first power domain of the system. At least one of the CAN controllers may be located in the first power domain of the system. The first power domain may be an always-on power domain.

The system may further comprise a microcontroller coupled to the at least one CAN controller, said microcontroller being preferably located in a second power domain of the system which is configured to be powered on or off. The system may be configured to select a CAN controller which is located in the first power domain. The selected CAN controller is thereby enabled to analyse and filter incoming CAN messages from the CAN bus on which activity has been detected. Moreover, the system and preferably the selected CAN controller analysing and filtering incoming CAN messages may be configured to cause the microcontroller in the second power domain to be powered up in case at least one relevant incoming CAN message (acceptable message) is detected by the selected CAN controller. The corresponding filters employed by the selected CAN controller in the process of identifying acceptable messages are programmable by the MCU. The definition of the filter defines in which cases the selected CAN controller triggers the further wake-up procedure which will be described below in detail.

In addition to activating at least one CAN controller in the first power domain and powering up the microcontroller in the second power domain, the system may be configured to cause additional components of or associated with the system to be powered up to handle incoming CAN messages if need be.

The system may be configured to be coupled to or comprise N CAN transceivers each of which being coupled to a respective CAN bus and wherein the system is further configured to control the power state of at least one of the CAN transceivers (assuming that the power-management feature is supported by the CAN transceivers in question). In this case, the N CAN listeners are coupled to the CAN Rx line via a respective one of the CAN transceivers. Preferably, when the system is in its deepest hibernation state and only the CAN listeners in the first 'always-on' power domain are available, the CAN transceivers can automatically be set in their lowest power state as well. As soon as the system is switched to a higher power state, e.g., by activating CAN controllers in the first power domain and/or powering on its second power domain, the CAN transceivers can be switched to a higher/active power state as well.

The system may further comprise a CAN scheduler, wherein the CAN scheduler may be configured to manage the data flow between the N CAN buses and the M CAN controllers, for instance, by controlling/setting the data connections between the CAN transceivers and the CAN controllers. This can be effected by means of a priority policy such as a Least-Recently-Used (LRU) policy. To this end, each of the M CAN controllers may have a respective input port and a respective output port, each input port being capable of receiving data from each of the N CAN buses by means of a respective input multiplexer and each output port being capable of transmitting data to each of the N CAN buses by means of a respective output decoder. The respective input multiplexer of each of the M CAN controllers may be configured to be coupled to the CAN scheduler to receive an input control signal specifying from which of the N CAN buses to receive data. Similarly, the respective output decoder of each of the M CAN controllers can be configured to be coupled to the CAN scheduler to receive an output control signal specifying to which of the N CAN buses to transmit data.

According to a second aspect of embodiments of the present invention there is provided a method comprising the following steps: providing N CAN listeners, wherein each of the CAN listeners is configured to be coupled to a respective CAN bus, M CAN controllers, wherein $1 \leq M < N$, and a power controller; detecting CAN activity on a CAN bus by means of one of the CAN listeners; in response to detecting CAN activity on the CAN bus, sending a control signal from the CAN listener detecting the CAN message to the power controller; in response to receiving the power control signal, controlling the activity state of at least one of the CAN controllers, for instance, by means of said power controller. Controlling the activity state of (one of) the CAN controllers may comprise clock enabling and/or reset deassertion. The method may further comprise the step of selecting at least one of the CAN controllers, the activity state of which is being controlled by the power controller, thereby enabling the selected CAN controller to analyse and filter incoming CAN messages from the CAN bus on which activity has been detected. In addition, the method may further comprise the steps of providing a microcontroller; controlling the power state of the microcontroller in case at least one relevant incoming CAN message is detected by the selected CAN controller; and fetching, by the microcontroller, at least on CAN message from the selected CAN controller. In case additional resources are needed to handle incoming CAN messages, the method may further comprise the step of powering on additional components to handle incoming CAN messages. Preferably, the method may further comprise the step of controlling the power state of at least one CAN transceiver coupled to one of the CAN buses.

BRIEF DESCRIPTION OF THE FIGURES

Embodiments of the invention will now be described by way of example only, in which.

DETAILED DESCRIPTION OF EMBODIMENTS OF THE INVENTION

The following description is presented to enable any person skilled in the art to make and use the invention, and is provided in the context of a particular application. Various modifications to the disclosed embodiments will be readily apparent to those skilled in the art. The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
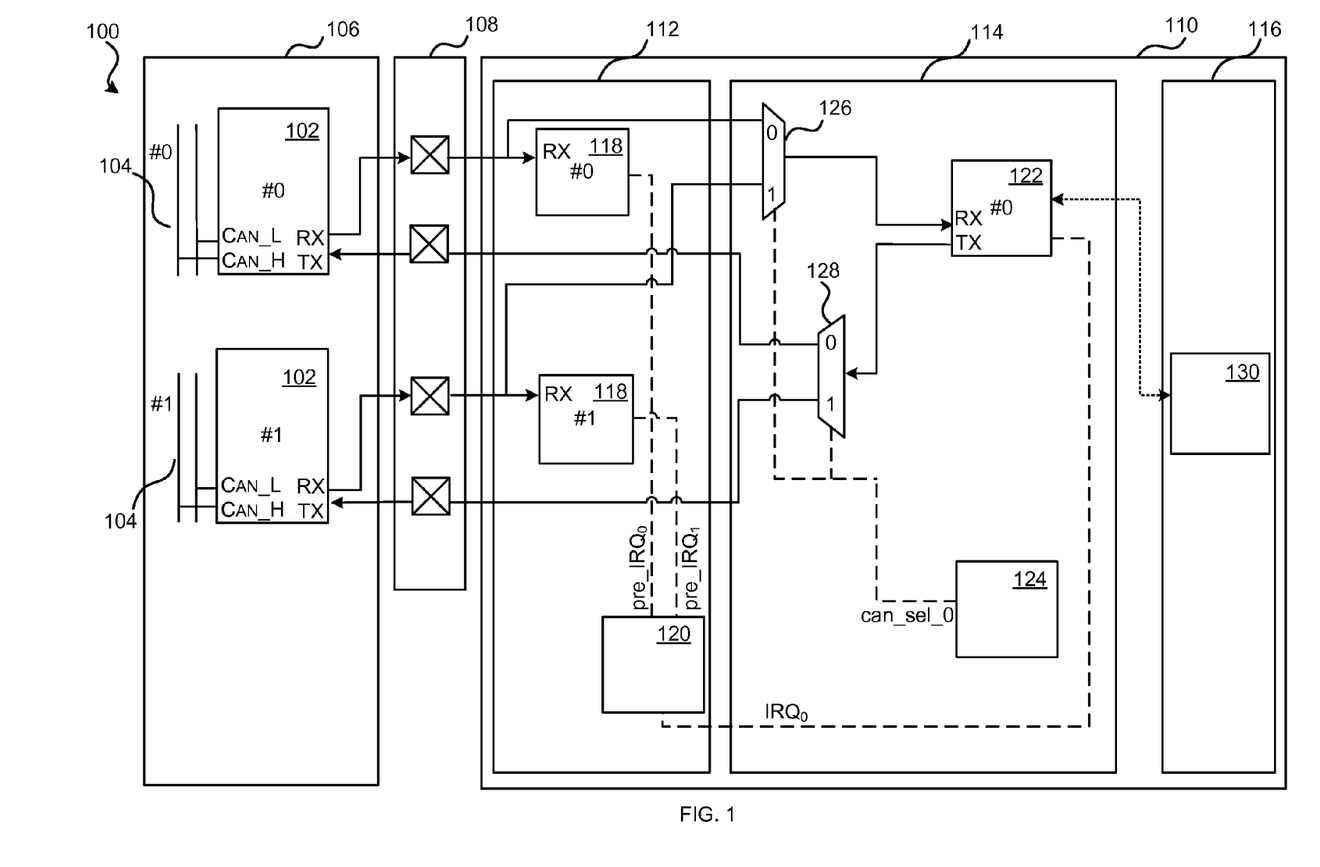
FIG. 1 shows a system according to an embodiment of the invention, where N=2 and M=1.

FIG. 1 shows an example of a system 100 in accordance with embodiments of the invention, where N=2 and M=1.

The system 100 includes two CAN transceivers 102. Each of the CAN transceivers 102 has a 'high' port corresponding to the dominant CAN bus voltage state CAN_H as well as a 'low' port corresponding to the recessive CAN bus voltage state CAN_L. Each CAN transceiver 102 is coupled to a respective CAN bus 104 by means of its high and low ports. In addition, each CAN transceiver 102 also has a transmit port Tx and a receive port Rx, wherein CAN messages received from its CAN bus 104 are passed on to the rest of the system 100 via the receive port Rx and CAN messages to be transmitted over its CAN bus 104 are received from the rest of the system 100 via the transmit port Tx.

The CAN transceivers 102 are located on a system board 106 which is coupled to the rest of the system by means of input-/output (TO) pads 108. Specifically, each of the inputs Tx and outputs Rx of the CAN transceivers 102 is electrically coupled to a respective one of the IO pads 108.

The system 100 further comprises a system-on-chip (SoC) sub-system 110 which, in turn, is comprised of at least two separate power domains: a first power domain comprising two sub-domains 112, 114 as well as a second power domain 116. As will be explained in further detail below, the two sub-domains differ in that the activity level of the elements located in the second sub-domain 114 such as the CAN controller(s) 122 can be adapted with a view to reducing power consumption, whereas the activity level of elements located in the first sub-domain such as the CAN listeners 118 typically cannot be adapted given that the CAN listeners are required to be able to 'listen' to the CAN buses 104 at any time. The SoC sub-system may comprise additional power domains, especially additional power domains which do not participate in the incremental wake-up scheme described herein.

The first power domain 112, 114 is an always-on power domain (AOPD). The first power domain 112, 114 comprises two CAN listeners 118 thereby matching the number of CAN transceivers 102 as well as the number of CAN buses 104. The first power domain 112, 114 further comprises a power controller 120. On its input side, each of the CAN listeners 118 is coupled to the receive port Rx of one of the CAN transceivers 102 via an IO pad 108. On its output side, each of the CAN listeners 118 is coupled to the power controller 120 to transmit signals (indicated as "pre-IRQ" in FIGS. 1 and 2) to the power controller 120.

The first power domain 112, 114 further comprises a CAN controller 122 and a CAN scheduler 124. The CAN controller 122 is coupled to the power controller 120 to transmit signals (indicated as "IRQ" in FIGS. 1 and 2) to the power controller 120. Moreover, a multiplexer 126 and a decoder 128 are located in the first power domain 112, 114 and assigned to the CAN controller 122.

On its input side, the multiplexer 126 is coupled to the receive ports Rx of the CAN transceivers 102 via respective IO pads 108. On its output side, the multiplexer 126 is coupled to the receive port Rx of the CAN controller 122. In addition, the multiplexer 126 is coupled to the CAN scheduler 124 to receive an input control signal (indicated as "CAN_sel_0" in FIG. 1) from the CAN scheduler 124 based on which the multiplexer 126 is configured to determine from which CAN transceiver 102 messages are to be received. On its input side, the decoder 128 is coupled to the transmit port Tx of the CAN controller 122. On its output side, the decoder 128 is coupled to the transmit ports Tx of the CAN transceivers 102 via respective IO pads 108. In addition, the decoder 128 is coupled to the CAN scheduler 124 to receive an output control signal from the CAN scheduler 124 based on which the decoder 128 determines to which CAN transceiver 102 messages are to be sent (indicated as "CAN_sel_0" in FIG. 1).

The CAN scheduler 124 is configured to manage the data flow and connectivity between the CAN buses 104, CAN listeners 118, CAN transceivers 102 and/or the CAN controller 122. To this end, the CAN scheduler 124 may implement a (pre-defined) priority policy according to which the processing of incoming CAN messages is handled by the CAN controller 122. One example, which is particularly beneficial in the context of a larger system, such as the one shown in FIG. 2, having N CAN transceivers 102 and M CAN controllers 122, wherein 1≤M<N, is a Least-Recently-Used (LRU) policy. The CAN scheduler 124 may also implement a time-out policy for releasing the CAN controller 122 in case of an extended period of inactivity on the CAN bus 104/CAN transceiver 102 to which the CAN controller 122 is currently assigned. In addition or alternatively, the CAN scheduler 124 may include an option for locking a specific assignment between CAN listeners/CAN transceivers and CAN controllers, which is again especially beneficial in the context of a larger system such as the one shown in FIG. 2. The power controller 120 and the CAN scheduler 124 may be operatively coupled (not shown) to allow the CAN scheduler 124 to manage the data flow through the multiplexer 126 and decoder 128 in accordance with and in response to signals sent from the power controller 120 to the CAN controller 122.

As indicated above, the second sub-domain 114 of the first power domain 112, 114 differs from the first sub-domain 112 in that the activity level of the CAN controllers 122 and the CAN scheduler 124 in the second sub-domain 114 may be controlled by means of the power controller 120 whereas the activity level of the CAN listeners 118 in the first sub-domain 112 is not controlled by the power controller 120. While both the first sub-domain 112 and the second sub-domain 114 thus share the same power level ('always-on' in this particular example), the actual consumption of power in the second sub-domain 114 is controllable. Depending on the activity detected on the CAN buses 104 the activity level of the CAN controllers 122 and/or the CAN scheduler 124 in the second sub-domain 114 can be (individually) controlled, at least between 'inactive' and 'active', whereby the power consumption of the second sub-domain 114 varies accordingly. In the 'inactive' state, the devices in question typically dissipate very little or even minimal power. Examples of how the activity level and thus the power consumption may be controlled comprise clock-gating and/or reset activation. While the activity level of the CAN controllers 122 may be controlled as described herein, they will remain powered on since they are located in the first 'always-on' power domain. This, in turn, implies that their configuration, especially their filters, will not be lost as will be explained in further detail below.

The second power domain 116 comprises a microcontroller 130. The microcontroller 130 is coupled to the CAN controller 122. The second power domain 116 has two power states. In the first state, the second power domain 116 receives power from its power supply (not shown), whereas in the second state it does not receive power from its power supply.

In the example shown in FIG. 1, the first power domain 112 and the second power domain 116 share the same power supply (local LDO) and the same clock supply (local PLL) to enable fast wake-up of the microcontroller when the second power domain 116 is in its second 'off' state as will be described below.

The CAN listeners 118, being in the first 'always on' power domain 112, act as bus activity detectors and preferably act as edge-detectors on the CAN bus Rx line. If one of the CAN listeners 118 detects activity on its CAN bus 104, it is configured to generate a signal pre_IRQ and send it to the power controller 120. The power controller 120 may then initiate the local PLL and request more power from the local LDO. In addition, the power controller 120 may de-assert the reset of the CAN controller 122 and/or may enable its clock. In addition or alternatively, the power controller 120 or another element of the system 100 may of course also initiate other steps in response to the signal pre_IRQ. As a result, the CAN controller 122 in the second sub-domain 114 is able to receive, analyse and filter incoming CAN messages from the CAN bus 104 on which activity has been detected.

In case the analysis and filtering by the CAN controller 122 results in the detection of a relevant "accepted" CAN message which requires additional resources, additional analysis and/or additional actions, e.g., in case of a security-related message, the CAN controller 122 triggers the power controller 120 by sending an interrupt message IRQ to the power controller 120 thereby prompting the power controller 120 to power up the second power domain 116 and thus the microcontroller 130. The CAN controller 122 subsequently forwards the CAN message to the microcontroller 130 for further processing. Alternatively, the microcontroller 130 fetches the message(s) from the CAN controller 122. The microcontroller 130 may then decide whether even further resources/components are required and have to be powered up in order to process relevant CAN messages by triggering the power controller 120 to power up the relevant resources/components or even the entire system at once.

In the exemplary embodiment shown in FIG. 1, CAN controller #0 can be initialised to serve CAN bus #0 in case activity is detected by CAN listener #0 by connecting the CAN controller #0 with CAN transceiver #0 via the multiplexer 126 and the decoder 128. In case activity is detected on CAN network #1 by means of CAN listener #1, the CAN controller #0 will handle the activity on the second CAN bus #1 as well by connecting the CAN controller #0 with the CAN transceiver #1 via the multiplexer 126 and the decoder 128 as described above. Thus, the CAN controller #0 will handle the activity on both CAN buses #0 and #1 without the need for an additional CAN controller thereby saving silicon area on the SoC chip as well as power.

Since the number of CAN controllers 122 is smaller than the number of CAN buses 104 as well as the number of CAN transceivers 102, it is possible that some CAN messages are missed. However, the CAN protocol and the specific architecture according to this embodiment of the invention ensure that the 'missed' CAN messages will eventually arrive/be responded to, potentially with a certain delay, e.g., after handling error packets on the CAN bus (the CAN protocol includes re-transmission of unanswered messages). In many cases, this may be an acceptable trade-off given that the system shown in FIG. 1 consumes less power than known systems. Moreover, common CAN initiators usually send a 'dummy' wake-up message for the target CAN node so that the missed message should not be critical.

The specific number of CAN listeners 118 will determine how many CAN networks are being 'listened' to and, thus, how many CAN networks can wake up the system. In other words, the architect of the system should allocate a specific number of CAN listeners corresponding to the number of CAN networks which should be able to wake the system. Exactly how many CAN controllers are required to handle the activity on the CAN networks depends on the circumstances. The exact number of CAN controllers and the ratio of CAN listeners/CAN networks to CAN controllers determines the performance of waking-up due to a CAN message in terms of error overhead. In many cases, a single CAN controller will be sufficient, especially when dealing with relatively 'sparse' CAN networks. However, more than one CAN controller will typically be required in case of a high likelihood regarding collision events amongst the CAN networks being listened to due to parallel activity. There is of course a trade-off between increasing the number of CAN controllers and the concomitant increase in static power consumption/leakage.

Figure 2:
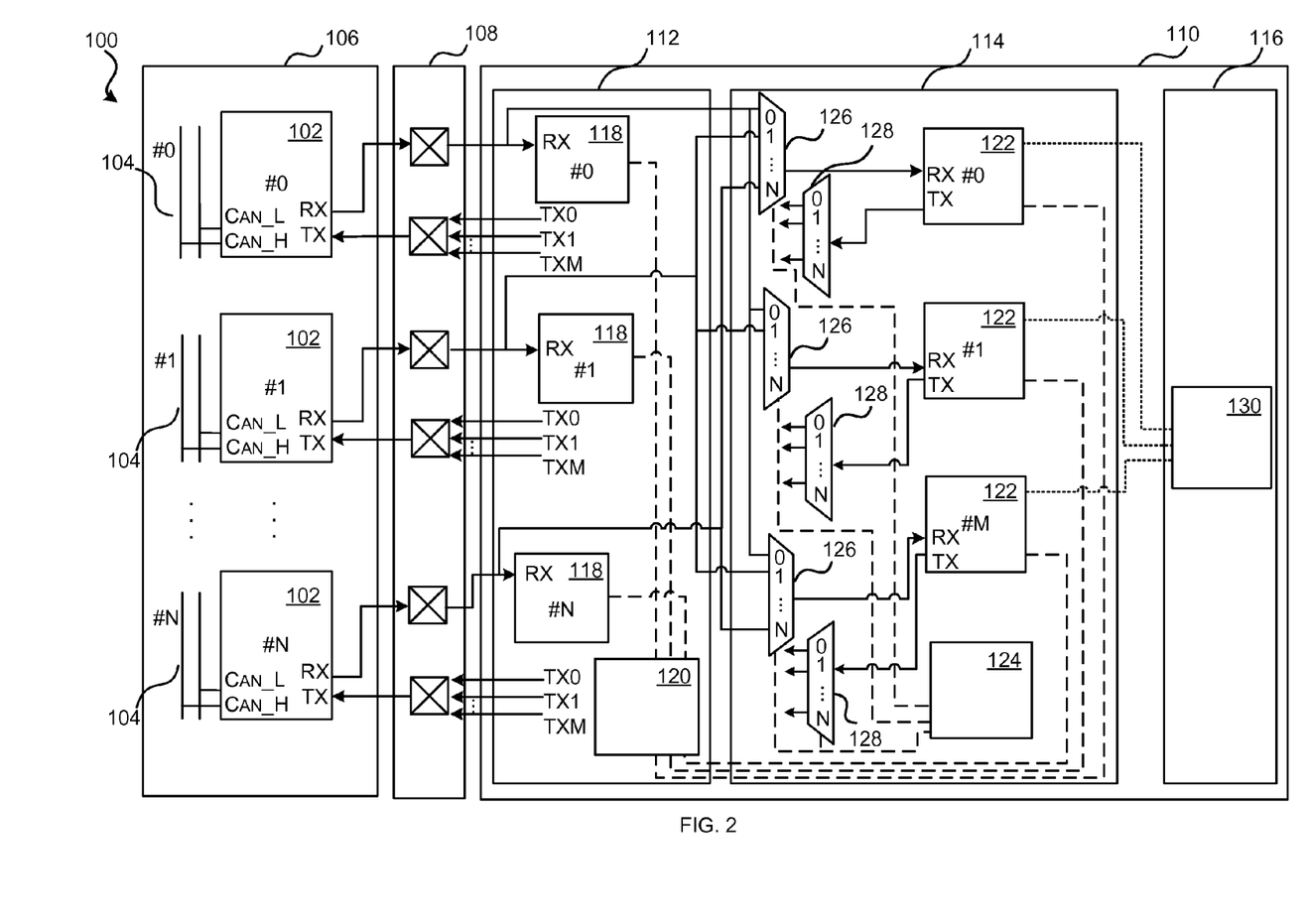
FIG. 2 shows another system according to an embodiment of the invention, where $1 \leq M < N$.

FIG. 2 shows another embodiment of the invention having N CAN transceivers 102 and M CAN controllers 122, wherein 1≤M<N. Note that in the embodiment shown in FIG. 1, M=1 and N=2. In many respects, the embodiment shown in FIG. 1 is therefore a special case of the more general system shown in FIG. 2 so that the remarks made in relation to FIG. 1 basically also apply to FIG. 2. While signalling and multiplexing become more complex, the same principles apply in that less power is consumed due to the fact that the number of CAN controllers 122 is smaller than the number of CAN transceivers 102. As in FIG. 1, each CAN controller 122 has assigned to it a respective multiplexer 126 and a respective decoder 128. For example, the transmit port Tx of the CAN controller 122 designated as #0 in FIG. 2 is connected to the Tx port of the CAN transceiver 102 correspondingly designated as #0 by means of the decoder 128 assigned to this CAN controller 122 and a respective pad 108 receiving signals Tx0 from the CAN controller 122 designated as #0. Similarly, the transmit port Tx of the CAN controller 122 designated as #M in FIG. 2 is connected to the Tx port of the CAN transceiver 102 designated as #0 by means of the decoder 128 assigned to this CAN controller 122 and a respective pad 108 receiving signals TxM from the CAN controller 122 designated as #M and so forth.

Similar to the operation of the power controller 120 described above in connection with FIG. 1, the power controller 120 shown in FIG. 2 is configured to activate at least one of the CAN controllers 122 based on a corresponding signal pre_IRQx sent to the power controller 120 by the CAN listener 118 designated as #x, wherein x can be any integer between 0 and N, which CAN listener 118 has detected activity on the CAN bus 104 to which it is connected. In response, the particular CAN controller 122 thus enabled will handle/filter incoming CAN messages from the CAN bus 104 on which activity has been detected. To this end, the CAN scheduler 124 is preferably operatively coupled (not shown) to the power controller 120 to manage the data flow through the multiplexers/decoders assigned to the selected CAN controller 122.

The system may implement a priority policy, such as a LRU policy, by coupling the first CAN listener sensing activity on 'its' CAN bus with CAN controller #0, the second CAN listener sensing activity on 'its' CAN bus with CAN controller #1, and so on until CAN controller #M is in use. At this stage, the system is fully loaded. In case yet another CAN listener senses activity on 'its' bus, this additional CAN bus may be served by the least recently used CAN controller.

In addition, power consumption is further reduced by the fact that only the CAN listeners 118, the power controller 120, (at least some of) the CAN controllers 122 and the CAN scheduler 124, i.e., a minimal set of resources required to react to incoming CAN messages, are located in the always-on power domain 112, 114 and that additional resources can be sequentially powered up if and as required. This minimal subset typically works with a low clock (without any PLL) resulting in a very low power consumption.

Figure 3:
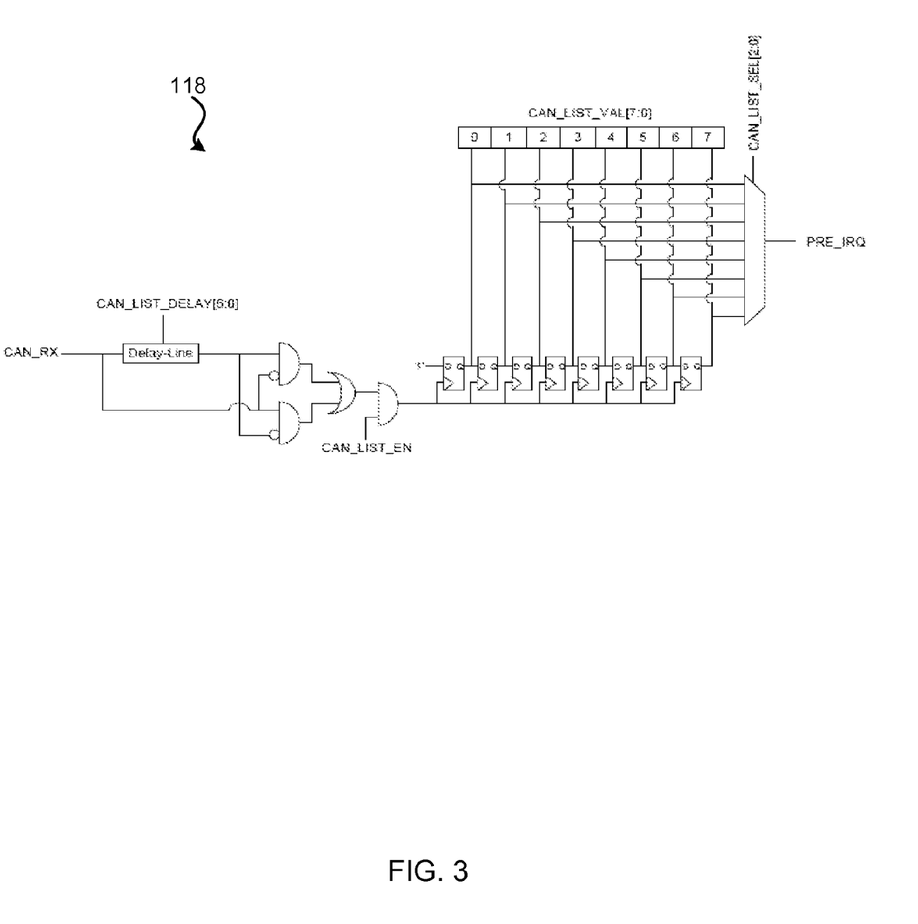
FIG. 3 shows a CAN listener according to another embodiment.

FIG. 3 shows an example of a CAN listener 118. As explained above, the CAN listeners 118 act as bus activity detectors, preferably by detecting edges on the CAN bus Rx line CAN_RX. The CAN listener 118 looks for transitions on the CAN bus (both edges) and triggers the power controller 120 to wake up the CAN controller 122. It can be configured for sniffing for a specific pattern (CAN_LIST_SEL, optionally monitored through CAN_LIST_VAL). Its sensitivity can be tuned through a programmable delay-line (CAN_LIST_DELAY).

The exemplary systems shown in FIGS. 1 and 2 therefore allow for a gradual wake-up of the system in response to the detection of a CAN message on one of the CAN buses 104 by one of the CAN listeners 118 such as the one shown in FIG. 3.

Figure 4:
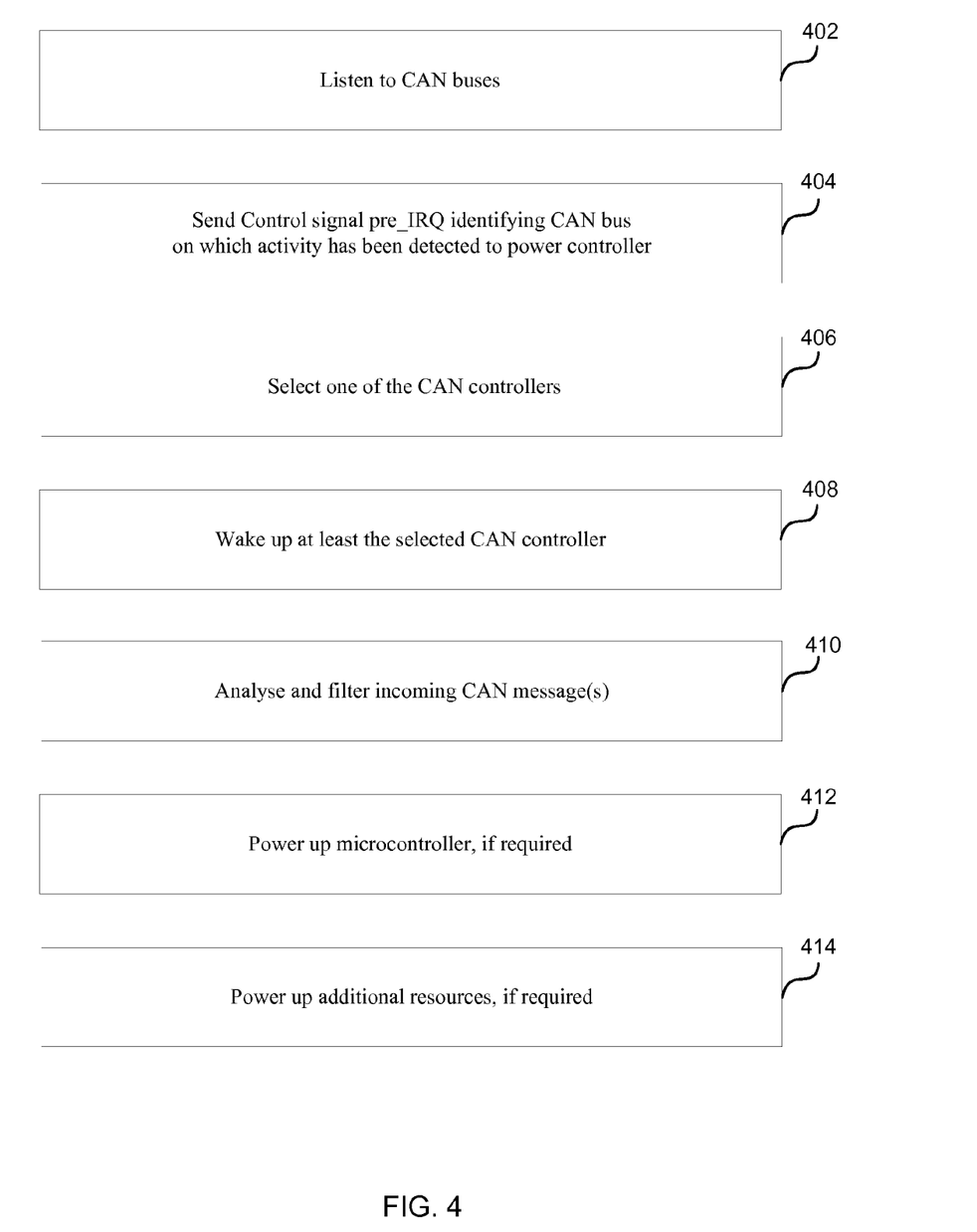
FIG. 4 shows a method according to an embodiment of the invention.

FIG. 4 shows an example of a wake-up method according to an embodiment of the invention. As will become clear from the following description of the method depicted in FIG. 4, waking up is done gradually depending on whether additional resources are needed or not. The following steps can be carried out in an environment such as one the systems shown in FIGS. 1 and 2, in which CAN listeners, a power controller as well as at least one CAN controller in a first, 'always-on' power domain and a microcontroller in a second power domain are provided.

In the first step 402, each CAN listener 118 listens to its CAN bus 104, waiting for activity on the bus. Once a particular CAN listener 118 has detected activity on its CAN bus 104, e.g., by means of edge detection as described above in connection with FIGS. 1 to 3, it sends a control signal (pre_IRQ) to the power controller 120 thereby identifying the CAN bus 104 on which activity has been detected, step 404. In case no activity is detected, the method repeats step 402.

In the next step 406, the CAN scheduler 124 couples one of the CAN controllers 122 to the CAN bus 104 on which activity has been detected as described above. The decision as to which CAN controller 122 to assign to this task is taken based on a priority policy, e.g. a LRU-based policy, as described above.

In response to the control signal pre_IRQ identifying the 'active' CAN bus 104, the power controller 120 can react in different ways, step 408. Typically, it would request PLL power-on in order to activate (clock+reset) one of the CAN controllers 122 in the second sub-domain 114 and, in addition, may power up the CAN controllers' memories, thereby enabling the selected CAN controller 122 to handle incoming CAN messages. In addition or alternatively, the power controller 120 may power up the entire system at once or it may turn resets off.

In the next step 410, the selected CAN controller 122 waits for (further) messages and, in case a message is detected, analyses and filters the message(s). In case the step of filtering by the CAN controller 122 results in a relevant accepted message, the CAN controller 122 will cause, in step 412, the second power domain 116 including the microcontroller 130 to be powered up (e.g. by triggering the power controller 120 to wake up the second power domain 116) and/or may cause a reset-off with respect to the resources of the second power domain 116. The microcontroller 130, once powered up, will then fetch the filtered message(s) from the CAN controller 122 in step 412 and start processing them.

In the final step 414, the microcontroller 130 may decide whether further resources/components are required and have to be powered up in order to process the CAN message(s). This may, for example, include a DRAM wake-up, a wake-up of the main processor, a DSP wake-up and or a wake-up of additional CAN controllers 122. To this end, the microcontroller may, for example, trigger the power controller 120 to power up the relevant resources/components or even the entire system at once.

The opposite direction from a powered-up system to hibernation may be effected by essentially going backwards from step 412. This may be triggered or otherwise initiated by the microcontroller 130 and/or the power controller 120. In addition or alternatively, hibernation may be achieved by means of a timeout mechanism.

Once the system has been power up completely, it is possible to switch to a topology in which each CAN network is handled by a designated CAN controller. To this end, additional CAN controllers which do not form part of the M CAN controllers participating in the wake-up scheme may be provided in the first power domain which, however, remain unused during the wake-up phase. Alternatively, those additional CAN controllers may be located in other power domains than the M CAN controllers referred to above.

The filters employed by the CAN controllers 122 in relation to incoming CAN messages can be programmable, preferably by means of the microcontroller 130. Given that the CAN controllers 122 are located in the first 'always-on' power domain 112, 114 and are thus always provided with power, the filters, once set/programmed, are essentially non-volatile.

At least some of the CAN transceivers 102 may include a designated power management mechanisms, which allows operating the CAN transceivers 102 in different power states for enhanced power saving. In other words, the CAN transceivers 102 have to be configured to allow external power management. In this case, the SoC sub-system 110 may control the power states of the (external) CAN transceivers 102 using either software ("manually" through the microcontroller 130) or hardware ("automatically" through the power controller 130 according to the incremental wake-up state). For example, when the system is in its deepest hibernation state and only the CAN listeners 118 located in the first, always-on power domain 112 are available, the CAN transceivers 102 can be set in a low or even lowest power state as well. The CAN transceivers 102 would then be switched back to a higher power state in parallel to the CAN controllers being activated.

While it is possible to integrate the CAN listeners 118 into the CAN transceivers 102, it is advantageous to have the CAN listeners 118 integrated into the SoC 110 instead which enables supporting a wider range of transceivers. Integrating the CAN listeners 118 together with the CAN controllers 122 and the microcontroller 130 on a single SoC 110 reduces the complexity of the system and provides for lower manufacturing and handling costs.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A system comprising:
N controller area network (CAN) listeners, each CAN listener of the N CAN listeners being configured to be coupled to a respective CAN bus and to detect CAN activity on the CAN bus to which it is coupled, N being a non-zero integer;
M CAN controllers, wherein $1 \leq M < N$, M being an integer;
a power controller located in a first power domain of the system, the first power domain being an always-on power domain; and
a microcontroller coupled to the at least one CAN controller, the microcontroller being located in a second power domain of the system which is configured to be powered on or off,
wherein each CAN listener is configured to generate a control signal in response to detecting CAN activity on the CAN bus to which it is coupled and send the control signal to the power controller which is configured to control an activity state of at least one of the CAN controllers,
wherein at least two CAN listeners of the N CAN listeners and at least one CAN controller of the M CAN controllers are located in the first power domain, and
wherein the power controller, in response to said control signal, is configured to control the activity state of a CAN controller by enabling the CAN controller to analyse and filter incoming CAN messages, wherein the CAN controller analysing and filtering incoming CAN messages is configured to cause the microcontroller to be powered up in case at least one relevant incoming CAN message is detected by the selected CAN controller.

2. The system of claim 1, wherein the power controller, in response to said control signal, is configured to control the activity state of a CAN controller by enabling the CAN controller to analyse and filter incoming CAN messages from the CAN bus on which activity has been detected.

3. The system of claim 1, wherein the system is configured to cause additional components of or associated with the system to be powered up to handle incoming CAN messages.

4. The system of claim 1, wherein the system is configured to be coupled to or comprise N CAN transceivers each of which being coupled to a respective CAN bus and wherein the system is further configured to control the power state of at least one of the CAN transceivers.

5. The system of claim 1, further comprising a CAN scheduler, wherein the CAN scheduler manages the data flow between the N CAN buses and the M CAN controllers.

6. The system of claim 5, wherein the CAN scheduler manages the data flow between the N CAN buses and the M CAN controllers by means of a priority policy such as a Least-Recently-Used (LRU) policy.

7. The system of claim 1, wherein each of the M CAN controllers has a respective input port and a respective output port, each input port being capable of receiving data from each of the N CAN buses by means of a respective input multiplexer and each output port being capable of transmitting data to each of the N CAN buses by means of a respective output decoder.

8. A method comprising the following steps:
providing N controller area network (CAN) listeners, wherein each of the N CAN listeners is configured to be coupled to a respective CAN bus, N being a non-zero integer, M CAN controllers, M being a integer, wherein 1≤M<N, a microcontroller, and a power controller located in a first power domain of the system, the first power domain being an always-on power domain, wherein at least two CAN listeners of the N CAN listeners and at least one CAN controller of the M CAN controllers are located in the first power domain;

detecting CAN activity on an active CAN bus by a CAN listener of the N CAN listeners;

in response to detecting the CAN activity on the active CAN bus, the CAN listener sending a control signal to the power controller;

in response to receiving the control signal, the power controller selecting and enabling a CAN controller of the M CAN controllers to analyse and filter incoming CAN messages on the active CAN bus; and causing powering up of the microcontroller by the CAN controller if at least one relevant incoming CAN message is detected by the CAN controller.

9. The method of claim 8, further comprising fetching, by the microcontroller, at least on CAN message from the CAN controller.

10. The method of claim 9, further comprising the step of powering on additional components to handle incoming CAN messages.

11. The method of claim 8, further comprising the step of controlling the power state of at least one CAN transceiver coupled to one of the CAN buses.

12. A method for low-power management in a controller area network (CAN), the method comprising:

detecting CAN activity on a CAN bus by a CAN listener of N CAN listeners, each CAN listener of the N CAN listeners being coupled to a respective CAN bus, N being a non-zero integer;

transmitting a control signal from the CAN listener to a power controller based on the detecting, the control signal identifying an active CAN bus with the CAN activity, the power controller being located in first power domain, the first power domain being an always-on power domain;

coupling a CAN controller of M CAN controllers to the active CAN bus, M being a integer, wherein 1≤M<N;

analysing and filtering at least one incoming CAN message on the active CAN bus by the CAN controller;

activating a microcontroller if the at least one incoming CAN message is a relevant accepted message, the microcontroller being located in a second power domain, the second power domain being configured to be activated and deactivated; and selectively activating, by the microcontroller, one or more additional resources to process the one or more incoming CAN messages based on the content of the one or more incoming CAN messages, wherein at least two CAN listeners of the N CAN listeners and at least one CAN controllers of the M CAN controllers are located in the first power domain.

* * * * *